United States Patent [19]

Viccaro et al.

[11] 3,915,638

[45] Oct. 28, 1975

[54] METHOD FOR DETERMINATION OF GLYCOLIC ACID

[75] Inventors: John Peter Viccaro, Whitestone, N.Y.; Edith Leroy Ambye, Fort Lee, N.J.

[73] Assignee: Lever Brothers Company, New York, N.Y.

[22] Filed: Jan. 10, 1974

[21] Appl. No.: 432,389

[52] U.S. Cl. .............................. 23/230 M; 23/230 B
[51] Int. Cl.$^2$ ................ G01N 31/00; G01N 33/00; G01N 33/16
[58] Field of Search ........... 23/230 M, 230 B, 230 R

[56] References Cited
OTHER PUBLICATIONS

V. P. Calkins, Microdetermination of Glycolic and Oxalic Acids, Ind. & Eng. Chem., Aval. Ed., Vol. 15, No. 12, pp. 762–763, (Jan. 1943).
G. D. Christian, Spectrometric Determination of Tartaric Acid With B–Naphthol, Talanta, Vol. 16, No. 2, pp. 255–261, (Feb. 1969).

*Primary Examiner*—Joseph Scovronek
*Attorney, Agent, or Firm*—Kenneth F. Dusyn; James J. Farrell; Arnold Grant

[57] ABSTRACT

A spectrophotometric method for the quantitative determination of glycolic acid and precursors thereof is based on the color produced with beta-naphthol in hot 92.5% by weight sulfuric acid. A known volume of a solution to be analyzed is evaporated to dryness, a solution of beta-naphthol in 92.5% sulfuric acid is added, heat is applied, whereby formaldehyde is formed and produces a colorless methylenebisnaphthol, which is oxidized to form a yellow-green product, the intensity of which is a measure of the amount of glycolic acid present. The method, omitting the evaporation step, may be adapted to the quantitative determination of formaldehyde.

6 Claims, No Drawings

METHOD FOR DETERMINATION OF GLYCOLIC ACID

BACKGROUND OF THE INVENTION

1. Field of the Invention

The analytical procedure described herein was developed as a result of a need for a more sensitive and precise quantitative method for determining microgram quantities of glycolic acid in solution.

The procedure involves a series of reactions, i.e., reaction of hot concentrated sulfuric acid with glycolic acid to form formaldehyde, the concurrent reaction of the formaldehyde thus produced with beta-naphthol to form a colorless methylenebisnaphthol, and the oxidation of the methylenebisnaphthol to form a yellow-green compound; the intensity of the color is a measure of the amount of glycolic acid present.

2. Discussion of the Prior Art

Many compounds react with beta-naphthol in hot concentrated sulfuric acid to form colored products. Reactions of this type are disclosed in the tests "A Handbook of Organic Analysis," H. T. Clark, 4th ed., p. 146, Arnold, London, 1926, and "Identification of Pure Organic Compounds," E. H. Huntress and S. P. Mulliken, pp. 100, 101, 234, Wiley, New York, 1949, and in the articles "Reactions and Reagents for the Detection of Organic Compounds," E. Eegriwe, III. Z. Anal. Chem. 100, 31–36 (1935), and "Spectrophotometric Determination of Tartaric Acid With Beta-Naphthol," G. D. Christian, Talanta, 16, 255–261 (1969).

It is known that glycolic acid when heated in concentrated sulfuric acid yields formaldehyde and formic acid, the latter decomposing to CO and $H_2O$. This type of reaction is discussed by G. Deniges in Ann. Chim. Phys. 18, 149–191 (1910) and in Bull. Soc. Chim., Fr., 5, 647 (1910), and by E. Eegriwe in I. Z. Anal. Chem. 89, 121–125 (1932).

The acid condensation of formaldehyde with phenols to form diarylmethanes is discussed by Feiser and Feiser in the text "Organic Chemistry," 3rd ed. p. 867, Reinhold, New York, (1956), and by Walker in the text "Formaldehyde," 3rd ed., pp 305–334, Reinhold, New York, (1967).

The oxidation of colorless methylenebisnaphthol by sulfuric acid to form a yellow-green o-quinoidal compound is discussed by Kohn and Ostersetzer in J. Chem. Soc. (London) 114, 501–502 (1918).

A colorimetric method for quantitatively determining glycolic acid based on the color produced with 2,7-dihydroxynaphthalene is reported by V. P. Calkins in Ind. Eng. Chem. Anal. Ed. 15, 762–763 (1943). The method therein described is effective over a range of 5 to 20 micrograms of glycolic acid but is less sensitive than the method herein disclosed and claimed, which is effective over the range of 0.2 to 15 micrograms of glycolic acid.

SUMMARY OF THE INVENTION

It has been found that a sulfuric acid solution of beta-naphthol may be employed as a reagent to determine quantitatively by colorimetric means the amount of glycolic acid in an aqueous solution thereof.

It is therefore an object of the invention to develop a sensitive method for the quantitative determination of glycolic acid.

It is a further object of the invention to develop a method for quantitatively determining formaldehyde, glycolic acid or precurosrs of these compounds by utilizing the color formed when the compound is treated with a solution of betanaphthol in sulfuric acid.

It is still another object of the invention to maximize color intensity to increase the sensitivity of the method of analysis.

Accordingly, the invention provides a method for the quantitative determination of glycolic acid comprising the admixture therewith of a sulfuric acid solution of betanaphthol to develop a yellow-green color, and measuring the intensity of the color.

The invention further provides a sensitive quantitative method for determining glycolic acid in microgram quantities comprising adding to glycolic acid or a water-soluble salt thereof in a substantially dry state, betanaphthol dissolved in sulfuric acid, whereby there is developed a yellow-green color, and measuring the intensity of the color.

The invention moreover contemplates the step of alkalizing an aqueous solution of glycolic acid by making it alkaline with an alkali metal hydroxide, preferably sodium hydroxide, then evaporating to dryness, whereby a residue forms, adding beta-naphthol dissolved in sulfuric acid, whereby a sulfuric-acid solution of the residue is formed and there is developed a yellow-green color, and measuring the intensity of the color.

More specifically the analytical procedure comprises evaporating a known volume of an alkaline solution containing a glycolic acid salt to dryness, adding thereto a sulfuric acid solution of beta-naphthol, heating said solution, diluting with sulfuric acid of lower concentration, holding the solution until there is developed a maximum color intensity, and measuring the absorbance of the solution.

The present method has the advantage that smaller quantities of glycolic acid can be determined with precision, and that fewer interference problems are likely to be encountered, as compared with the prior art method employing 2,7-dihydroxynaphthalene, discussed hereinbefore.

DETAILED DESCRIPTION OF THE INVENTION

The sensitivity of the analytical procedure described herein is enhanced by adherence to critical factors, these being (a) the concentration of the sulfuric acid solutions, (b) the concentration of beta-naphthol, (c) the length of time of the heating step, and (d) the waiting time between the dilution step and determination of absorbance.

During the course of the development of the method, it becomes evident that the above-named criticalities must be strictly adhered to for maximum color formation.

A detailed discussion of these criticalities is set forth in the Examples hereinafter.

Moreover, Beer's law is followed when the level of glycolic acid is within the range of 0.2 to 15 micrograms, and for best results the amount of glycolic acid in the test solution should be within these limits.

The analytical procedure described herein is a highly sensitive quantitative procedure for the determination of glycolic acid. As low as 0.20 micrograms of glycolic acid can be determined. The procedure is flexible in that substantially any dilution volume may be used after the color has been developed.

Prior to the evaporation step the glycolic acid present in the sample to be analyzed is converted to a water-soluble salt thereof to prevent decomposition of the acid via glycolide formation during evaporation of the sample. The evaporation step moreover volatilizes any formaldehyde and acetaldehyde present thereby eliminating interference by these substances, and in addition permits the use of very dilute samples.

As shown in Example 2, maximum absorbance is obtained when the concentration of sulfuric acid in the reaction mixture is in the 92 to 93% range and in particular at 92.5%. This finding suggests that the ratio of acid to water (about 92.5 to 7.5) during the reaction is critical, since acid levels of 90% and 96% result in greatly reduced absorbance. A critical balance between acid and water is also required in the final dilution step because the color intensity is greatest when the reaction mixture is diluted to a final acid concentration of approximately 82%.

High concentrations of dextrose or other carbohydrates may interfere considerably, mainly by reacting with beta-naphthol to form furfurals, and partly by charring due to the high concentration of sulfuric acid. However, the aforementioned substances can be removed if desired by precipitation with organic solvents or by hydrazone formation. If these methods prove unsatisfactory the glycolic acid can be separated as the insoluble calcium or barium salt. Lactic and tartaric acids or their sodium salts have chemical characteristics very similar to those of glycolic acid, and cannot be removed or separated from glycolic acid by simple means. Lactic acid yields acetaldehyde when heated in concentrated sulfuric acid, whereas tartaric acid forms glycolaldehyde. These end products are believed to be responsible for the colors which interfere with the glycolic acid determination.

The color formation upon which the present analytical procedure depends is believed to be the result of a Baeyer reaction, which is essentially the acidic condensation of formaldehyde with phenols to form diarylmethanes, followed by oxidation by sulfuric acid to yield a yellow-green ortho-quinoidal compound or a cyclic keto ether compound. Accordingly the method is applicable to the determination of precursors of formaldehyde which form formaldehyde under the influence of concentrated (about 92%–93% by weight) sulfuric acid, for example glycoyl esters, glycolic ethers, hexamethylene tetramine, formaldoxime, and formals, such as trimethylene-d-mannitol, trimethylene-d-sorbitol, dimethylene-d-dulcitol, diacetyldimethylene-d-mannitol, diacetyldimethylene-d-dulcitol and cellulose formal.

The analytical procedure and the criticalities therein will be more fully understood by reference to the following examples.

EXAMPLE 1

Glycolic acid is determined quantitatively in the manner described below.

Reagents used are as follows:

Sulfuric acid, 92.5% by weight, is prepared by adding 100 ml of concentrated sulfuric acid, reagent grade (96%) to 7 ml of water.

Sulfuric acid, 80% by weight, is prepared by adding 100 ml of concentrated sulfuric acid, reagent grade (96%) to 37 ml of water.

Beta-Naphthol reagent is prepared by dissolving 100 mg of beta-naphthol in about 50 ml of 92.5% sulfuric acid contained in a 100 ml volumetric flask. When the beta-naphthol has completely dissolved, additional 92.5% sulfuric acid is added up to the 100 ml mark. The reagent thus prepared is stored at 4°C in an amber bottle. When the reagent is needed, a portion thereof removed and allowed to warm to room temperature in the dark. Any surplus reagent from this portion is discarded.

The assay procedure is conducted as follows:

A known volume, preferably one ml or less, of an aqueous solution to be analyzed and containing not more than 15 micrograms of glycolic acid is made alkaline with 0.01 N NaOH or other fixed alkali hydroxide in an 18 mm × 150 mm test tube and evaporated to dryness in an oven at a temperature of 125°–130°C to form a substantially anhydrous residue. One ml of the beta-naphthol reagent prepared as described above is added to the dry residue. The contents are vigorously mixed in a vortex mixer until the residue has dissolved. The tube is covered with a glass marble, placed in a boiling water bath for 20 minutes, cooled to room temperature, and centrifuged to collect water that has condensed on the inner walls of the tube.

Four ml of the 80% sulfuric acid reagent prepared as described above are added to the tube to dilute the aforesaid solution, and the contents of the tube are thoroughly mixed on a vortex mixer. The tube and its yellow-green contents are allowed to stand for 10 minutes at room temperature to maximize color intensity, and the intensity of the color is measured by absorbance in a Shimadzu QV-50 spectrophotometer at 480 nm (480 millimicrons) with distilled water as a reference. The level of glycolic acid in the sample is calculated by comparison with a standard.

EXAMPLE 2

From the data below it is concluded that the strength of the sulfuric acid employed in the reaction step is critical at 92.5% by weight.

When reactions are carried out as described in Example 1 but employing sulfuric acid at various concentrations ranging from 70 to 96% by weight, maximum absorbance occurs at an acid strength of 92.5% by weight. The 70% acid solution has a zero net absorbance due to insolubility of beta-naphthol in this strength acid. The results are shown in Table I, below.

TABLE I

| Effect of Concentration of Sulfuric Acid Used For The Reaction Step | | |
|---|---|---|
| % $H_2SO_4$ by Weight | Net Absorbance | Color |
| 96.0 | 0.84 | Yellow-green |
| 93.0 | 1.01 | '' |
| 92.5 | 1.03 | '' |
| 92.0 | 1.00 | '' |
| 90.0 | 0.78 | '' |
| 85.0 | 0.34 | Yellow |
| 80.0 | 0.06 | '' |
| 70.0 | 0.00 | — |

In another series of tests wherein the strength of the sulfuric acid used for the dilution step is varied it is found that the strength of the acid for this purpose is critical at 80% by weight, making the strength of the acid in the final mixture about 82%. The results are shown in Table II, below.

TABLE II

| % $H_2SO_4$ in Diluting Acid | Net Absorbance | Final % $H_2SO_4$ |
|---|---|---|
| 96.0 | 1.31 | 95.0 |
| 92.5 | 1.35 | 92.5 |
| 90.0 | 1.35 | 91.9 |
| 85.0 | 1.37 | 86.4 |
| 80.0 | 1.42 | 81.9 |
| 70.0 | 1.21 | 74.8 |
| Distilled Water | 1.03 | 29.5 |

Effect of Final Acid Concentration

EXAMPLE 3

This Example describes the experiment wherein the results obtained show that the preferred concentration of beta-naphthol in 92.5% sulfuric acid for use in the reaction step is 1000 micrograms per ml.

To carry out the experiment, 15 micrograms of glycolic acid are treated with various concentrations of betanaphthol ranging from 50 to 2000 micrograms in 1 ml of 92.5% sulfuric acid. When treated in the manner described in Example 1, the absorbance increases rapidly with increasing amounts of beta-naphthol up to about 250 micrograms and then gradually levels off. As a result of this experiment, it is concluded that a preferred concentration is 1000 micrograms of beta-naphthol per ml of 92.5% sulfuric acid. This amount produces only a small blank reading and insures enough betanaphthol to react with all of the glycolic acid in the event that small quantities of other reactive substances are present.

EXAMPLE 4

The optimum time for allowing completion of the reaction between glycolic acid and beta-naphthol is determined by treating seven 15 microgram portions of glycolic acid as described in Example 1, except that the portions are separately heated for 5, 10, 15, 20, 30, 45 and 60 minutes. The reaction is quite rapid up to 15 minutes, and reaches a maximum in 20 minutes, with no further change up to the 60 minute period.

EXAMPLE 5

The time required for maximum color development is determined as follows:

Fifteen micrograms of glycolic acid is treated as in Example 1, except that the absorbance is determined at intervals between 5 and 90 minutes following dilution with 4 ml of 80% sulfuric acid, and again determined after storing 20 hours at 4°C. The solution exhibited maximum absorbance after 10 minutes with only slight change after the 20 minute period.

EXAMPLE 6

Certain substances likely to be present in biological samples present some interference problems as set forth below.

The results of an investigation to determine whether certain substances may interfere with the accuracy of the determination of glycolic acid are set forth below in Table III. The substances listed are chosen as those most likely to be present along with glycolic acid in biological samples. Under the conditions set forth in Example 1, 15 micrograms of the listed compounds exhibit the effects shown. Absence of data in the table, other than the net absorbance, indicates no interference.

It will be noted that weights of dextrose, lactic acid and tartaric acid equal in weight to glycolic acid interfere with the determination, and contribute errors to the extent of about 9, 7.5 and 2.5% respectively. The Krebs cycle intermediates, citric, fumaric, malic, oxaloacetic, and succinic acids, do not interfere. Formaldehyde and acetaldehyde offer no interference, since both substances are removed during the evaporation step.

TABLE III

Interference Substances

| Compound | Net Absorbance | Glycolic Acid Equivalent- Micrograms | Error, % | Color |
|---|---|---|---|---|
| Benzoic Acid | 0.003 | | | |
| Citric Acid | 0.005 | | | |
| Dextrose | 0.125 | 1.3 | 9.0 | Green |
| Fumaric Acid | 0.003 | | | |
| Gluconic Acid | 0.005 | | | |
| Glycolic Acid | 1.420 | 15.0 | | Yellow-Green |
| Lactic Acid | 0.110 | 1.1 | 7.5 | Yellow |
| Malic Acid | 0.005 | | | |
| Oxalic Acid | 0.003 | | | |
| Oxaloacetic Acid | 0.003 | | | |
| Succinic Acid | 0.002 | | | |
| Tartaric Acid | 0.038 | 0.4 | 2.5 | Blue-Green |

EXAMPLE 7

In this Example there are described experiments which indicate that the color formation in the analytical procedure is the result of reaction between beta-naphthol and formaldehyde, the latter being known to result from the action of sulfuric acid on glycolic acid.

To carry out the experiment, 1 ml of 96% $H_2SO_4$-$\beta$-naphthol (1000 $\mu$g) is added to 0.08 ml of a 0.00246 molar solution of each of the substances listed in Table IV below, and treated in accordance with the procedure described in Example 1, except that the steps of the NaOH addition and evaporation are omitted to avoid volatilization of the aldehydes. (The above reagent was employed in place of that used in Example 1 in order to maintain an initial acid concentration of 92.5% for maximum sensitivity.) The data lead to the conclusion that formaldehyde is responsible for the color formation, since glycolic acid and formaldehyde on an equal molar basis exhibit similar absorbances and colors. In addition the colors have identical spectra from 350 to 700 nm with maxima at 480 nm. The data also show that the reaction is relatively specific for formaldehyde, since acetaldehyde is the only other aldehyde tested which gives a positive response.

TABLE IV

Reaction of Aldehydes With Beta-Naphthol

| Test Solutions | Net Absorbance | Glycolic Acid Equivalence, Micrograms | Color |
|---|---|---|---|
| Glycolic Acid | 1.42 | 15.0 | Yellow-Green |
| Acetaldehyde | 0.12 | 1.2 | Yellow |
| Butyraldehyde | 0.003 | nil | negligible |
| Formaldehyde | 1.44 | 15.2 | Yellow-Green |
| Propionaldehyde | 0.004 | nil | negligible |

The above described method may be employed for the determination of microgram quantities of formaldehyde, or a precursor of formaldehyde, or mixtures of formaldehyde and its precursors. As little as $0.08\mu$ of formaldehyde can be determined.

Having described the invention, those skilled in the art will know modifications within the spirit thereof, and the invention is to be limited only within the scope of the appended claims.

What is claimed is:

1. A method for quantitatively determining glycolic acid in microgram quantities comprising evaporating an alkaline solution thereof, whereby a residue forms, adding at least 50 micrograms of beta-naphthol dissolved in 1 ml of 92–93% by weight sulfuric acid, whereby said residue dissolves to form a solution, and there is developed a yellow-green color, and measuring the intensity of said color.

2. A method in accordance with claim 1 wherein said glycolic acid is in aqueous solution, and said solution is made alkaline and evaporated to dryness prior to the addition of said beta-naphthol.

3. A method in accordance with claim 1 wherein said sulfuric acid solution is heated subsequent to dissolving said residue.

4. A method in accordance with claim 1 wherein there is added to said sulfuric acid solution an 80% by weight solution of sulfuric acid to maximize development of said color.

5. A method in accordance with claim 1 wherein the $\beta$-naphthol concentration is 1,000 micrograms.

6. A method for quantitatively determining glycolic acid in microgram quantities comprising:
  i. evaporating an alkaline solution to be tested to form a substantially anhydrous residue,
  ii. dissolving said residue in a solution of at least 50 micrograms of beta-naphthol in 1 ml of sulfuric acid of 92–93% strength by weight,
  iii. heating said solution,
  iv. diluting said solution with sulfuric acid of 80% strength by weight,
  v. holding said solution at room temperature until there is developed a maximum color intensity,
  vi. measuring the intensity of said color.

* * * * *